(12) United States Patent
Khaldi et al.

(10) Patent No.: US 11,106,438 B2
(45) Date of Patent: Aug. 31, 2021

(54) INTEGRATION OF AUTOMATED COMPLIER DATAFLOW OPTIMIZATIONS

(71) Applicant: Intel Corporation, Santa Clara, CA (US)

(72) Inventors: Dounia Khaldi, Austin, TX (US); Rakesh Krishnaiyer, Milpitas, CA (US); Rajiv Deodhar, Phoenix, AZ (US); Daniel Woodworth, Hudson, MA (US); Joshua Cranmer, Hudson, MA (US); Kent Glossop, Nashua, NH (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/832,797

(22) Filed: Mar. 27, 2020

(65) Prior Publication Data

US 2020/0233649 A1 Jul. 23, 2020

(51) Int. Cl.
*G06F 9/44* (2018.01)
*G06F 8/41* (2018.01)

(52) U.S. Cl.
CPC .................................. *G06F 8/4435* (2013.01)

(58) Field of Classification Search
CPC ...................................................... G06F 8/4435
See application file for complete search history.

(56) References Cited

U.S. PATENT DOCUMENTS

| | | | |
|---|---|---|---|
| 4,839,839 A * | 6/1989 | Tokumaru | G06F 5/015 708/209 |
| 7,420,568 B1 * | 9/2008 | Bittel | G06T 15/005 345/422 |
| 2004/0015934 A1 * | 1/2004 | Muthukumar | G06F 8/4452 717/160 |
| 2012/0102496 A1 * | 4/2012 | Ahn | G06F 9/5066 718/102 |
| 2014/0006881 A1 * | 1/2014 | Loimuneva | G06F 11/0706 714/57 |
| 2015/0288965 A1 * | 10/2015 | Li | H04N 19/124 375/240.03 |
| 2017/0048320 A1 * | 2/2017 | Farmahini-Farahani | H04L 67/1097 |
| 2018/0189667 A1 * | 7/2018 | Tsou | G06N 20/20 |
| 2019/0004980 A1 * | 1/2019 | Maor | G06F 9/30076 |
| 2019/0018815 A1 * | 1/2019 | Fleming | G06F 13/423 |

\* cited by examiner

*Primary Examiner* — Jae U Jeon
(74) *Attorney, Agent, or Firm* — Kacvinsky Daisak Bluni PLLC

(57) ABSTRACT

Various embodiments are generally directed to optimizing dataflow in automated transformation frameworks (e.g., compiler, runtime, etc.) for spatial architectures (e.g., Configurable Spatial Accelerator) that translate high-level user code into forms that use "streams" (e.g., Latency Insensitive Channels, line buffers) to reduce overhead, eliminate or improve the efficiency of redundant memory accesses, and improve overall throughput.

20 Claims, 22 Drawing Sheets

```
for (int j=Radius; j<N-Radius; j++) {
    double t = 0;
    for (int i=-Radius; i<=Radius; i++) {
        t + = a[j+i];
    }
    b[j] = t;
}
```

*320*

```
typedef struct { double v[2]; } ComplexD;
const int Nc = 3;
void dslash_offload(ComplexD *U, ComplexD *Psi, ComplexD *Phip, ...)
{
// Loop is marked parallel by the compiler
   for (uint64_t site = 0; site < nsite; site++) {
      ...
      // Loop is marked parallel by the compiler
      for (uint64_t s = 0; s < Ls; s++) {
         ...
         // Loop is marked parallel by the compiler
         for (uint64_t mu = 0; mu < 8; mu++) {
            ...
            // c1,c2 loops are completely unrolled by the compiler
            for (int c1 = 0; c1 < Nc; c1++) { // Nc is 3
              for (int c2 = 0; c2 < Nc; c2++) {
                 // 72 values are read from U
                 // The index into U is independent of the value of "s"
                 siteU.v[c1][c2] =
                    U[site*Nc*Nc * 8 + mu*Nc*Nc + c1*Nc + c2]; // 72 values
            read
              }
            }
            ... // Long set of computations inside the mu-loop using siteU } // end mu loop
      } // end s loop
   } // end site loop
} // end dslash_offload()
```

```
void dslash_offload(ComplexD *U, ComplexD *Psi, ComplexD *Phip, ...)
{
  // Loop is marked parallel by the compiler
  for (uint64_t site = 0; site < nsite; site++) { csa::stream<double, 6, 8> lic_r[Nc][Nc];
    csa::stream<double, 8, 8> lic_i[Nc][Nc];
    // Loop is marked parallel by the compiler
    for (uint64_t mu = 0; mu<8; mu++) { // L1: Loopnest newly created by cmplr
      // c1,c2 loops are completely unrolled by the compiler
      for (int c1 = 0; c1<Nc; c1++) {
        for (int c2 = 0; c2<Nc; c2++) {
          lic_r[c1][c2].write(U[site*Nc*Nc * 8 + mu*Nc*Nc + c1*Nc + c2].v[0]);
          lic_i[c1][c2].write(U[site*Nc*Nc * 9 + mu*Nc*Nc + c1*Nc + c2].v[1]);
        }
      }
    }

// L2: Original loop-nest modified to use values from LICs follows:
    // Loop is marked parallel by the compiler
    for (uint64_t s = 0; s < Ls; s++) {
      ...
      // Loop is marked parallel by the compiler
      for (uint64_t mu = 0; mu < 8; mu++) {
        ...
        // c1,c2 loops are completely unrolled by the compiler
        for (int c1 = 0; c1 < Nc; c1++) { // Nc is 3
          for (int c2 = 0; c2 < Nc; c2++) {
            siteU.v[c1][c2].v[0] = lic_r[c1][c2].rotate<72>(s, 0, Ls, 1);
          //read & write
            siteU.v[c1][c2].v[1] = lic_i[c1][c2].rotate<72>(s, 0, Ls, 1);
          }
        }
        ... // Long set of computations inside the mu-loop using siteU
      } // end mu loop
    } // end s loop
  } // end site loop
} // end dslash_offload()
```

Original Loop before Scalar Replacement

```
// Case when Radius is 1
for (int j=2; j<N; j++)
   b[j] = a[j-1] + a[j] + a[j+1]; // 3 loads inside the loop
```

Transformed Loop after Scalar Replacement

```
t0 = a[1]; // Initialize first 2 array accesses from outside the loop
t1 = a[2];
for (int j2=0; j2<N-2; j2++)
{
   add2 = t0 + t1;
   t2 = a[j2+3]; // Only one load remains inside the loop
   add5 = add2 + t2;
   b[j2+2] = add5;
   t0 = t1; // Rotation of values from one iteration to next
   t1 = t2;
}
```

```
for (int j=Radius; j<N-Radius; j++) {
        double t = 0;
        for (int i=-Radius; i<=Radius; i++) {
           t += a[j+i];
        }
        b[j] = t;
}
```

```
int Diameter = Radius * 2;
csa::stream<double, Diameter - 1, Diameter - 1> lic;

for (int j = 0; j < Diameter - 1; j++) {
    lic.write(a[j]);
} for (int j=Radius; j<N-Radius; j++) {
    double t = 0;
    for (int i=-Radius; i<=Radius; i++) {
        t += lic.shift(a[j + i], j, Radius, N - Radius - 1, 1, i, - Radius, Radius, 1);
    }
    b[j] = t;
}
```

```
    // Loop is marked parallel by the compiler
for (int k = 0; k < num_samples; ++k) {
    const SfSparseVector& x = data_set_p->VectorAtICX(x_id_vector[k]);
    cluster_centers_->InnerProductAllNoMallocNoXScaleICXCSA(x, distance_array[k]);
    ...
} inline_attribute_((always_inline))
void InnerProductAllNoMallocNoXScaleICXCSA(const SfSparseVector& x,
                    ICX_CSA_TYPE *__restrict__ inner_product) const
{
#define BLOCK_FACTOR 64
    ... // Loop is marked parallel by the compiler
    for(int rowIndexB = 0; rowIndexB < rowCountScaled; ++rowIndexB) {
        int rowIndexSB = rowIndexB * BLOCK_FACTOR;
        ICX_CSA_TYPE tmp2[BLOCK_FACTOR];

for (int rowIndex = rowIndexSB; rowIndex < rowIndexSB + BLOCK_FACTOR; ++rowIndex) {
            tmp2[rowIndex-rowIndexSB] = 0.0;
        } // Loop is marked parallel by the compiler
        for (int i = 0; i < numFeatures; ++i) {
            ICX_CSA_TYPE* weightMatrixColumn = weightMatrix_[x.FeatureAt(i)];
            ICX_CSA_TYPE currXValue = x.ValueAt(i);

// Loop completely unrolled by compiler
            for (int rowIndex = rowIndexSB; rowIndex < rowIndexSB + BLOCK_FACTOR; ++rowIndex) {
                tmp2[rowIndex-rowIndexSB] += weightMatrixColumn[rowIndex] * currXValue;
            }
        } // numFeatures loop end // Innermost Loop Candidate for transformation with streams Loop10 – store loop
        for (int rowIndex = rowIndexSB; rowIndex < rowIndexSB + BLOCK_FACTOR; ++rowIndex) {
            inner_product[rowIndex] = tmp2[rowIndex-rowIndexSB];
        }
    } // rowIndexB loop end
    ...
} // end void InnerProductAllNoMallocNoXScaleICXCSA()
```

_400_

*FIG. 4A* last innermost loop labeled Loop 10

```
// Innermost Loop Candidate for transformation with streams Loop10 – store loop
for (int rowIndex = rowIndexSB; rowIndex < rowIndexSB + BLOCK_FACTOR; ++rowIndex) {
      inner_product[rowIndex] = tmp2[rowIndex-rowIndexSB];
}
``` can be optimized by the compiler Using the merge operation

```
csa::stream<float> out[BLOCK_FACTOR], outone;
// Loop L10_1 that gets completely unrolled and values are merged into a single stream outone
for (int rowIndex = rowIndexSB; rowIndex < rowIndexSB + BLOCK_FACTOR; ++rowIndex) {
    out[rowIndex-rowIndexSB].write(tmp2[rowIndex-rowIndexSB]);
}
merge(outone, out);

// Loop L10_2 that is NOT unrolled so that the stores are issued as unit-strided
// Loop is marked parallel by the compiler
for (int rowIndex = rowIndexSB; rowIndex < rowIndexSB + BLOCK_FACTOR; ++rowIndex) {
    inner_product[rowIndex] = outone.read(); //a streaming store
}
```

```
csa::stream<float> outfirst[BLOCK_FACTOR/2], outsecond[BLOCK_FACTOR/2], outone, outtwo;
// Loop L10_3 that gets completely unrolled and values are merged into a single stream outone
 for (int rowIndex = rowIndexSB; rowIndex < rowIndexSB + BLOCK_FACTOR/2; ++rowIndex) {
    outfirst[rowIndex-rowIndexSB].write(tmp2[rowIndex-rowIndexSB]);
}
merge(outone, outfirst);

// Loop L10_4 that gets completely unrolled and values are merged into a single stream outtwo
for (int rowIndex = rowIndexSB + BLOCK_FACTOR/2;
                        rowIndex < rowIndexSB + BLOCK_FACTOR; ++rowIndex) {
    outsecond[rowIndex-rowIndexSB-BLOCK_FACTOR/2].write(tmp2[rowIndex-rowIndexSB]);
}
merge(outtwo, outsecond);

// Loop L10_5 that is NOT unrolled so that the stores are issued as unit-strided
// Loop is marked parallel by the compiler
for (int rowIndex = rowIndexSB; rowIndex < rowIndexSB + BLOCK_FACTOR/2; ++rowIndex) {
    inner_product[rowIndex] = outone.read(); //a streaming store
}

// Loop L10_6 that is NOT unrolled so that the stores are issued as unit-strided
// Loop is marked parallel by the compiler
for (int rowIndex = rowIndexSB + BLOCK_FACTOR/2; rowIndex < rowIndexSB; ++rowIndex) {
    inner_product[rowIndex] = outtwo.read(); //a second streaming store operation
}
```

| Non-unit stride | Unit-stride |
|---|---|
| // We want to get rid of this stride<br>for(long long k = 0; k<K ; k+=2) {<br>  b_in[j][0][0].write(matB[(j+jj) * ldb + k]);<br>  b_in[j][0][1].write(matB[(j+jj) * ldb + k+1]);<br>} | for(long k =0; k<K ; k+=1) //no stride<br>// a streaming load<br>  b_st[j].write(matB[(j+jj) * ldb + k]);<br><br>for(long k =0; k<K ; k+=2)<br>  scatter(b_st[j], b_in[j][0][0], b_in[j][0][1]); |

```
void mm(long long M, long long N, long long K,
        double *restrict matA, long long lda,
        double *restrict matB, long long ldb,
        double *restrict matC, long long ldc) {
  stream <double> a_in[16][16];
  stream <double> b_in[16][16];
#pragma parallel sections
#pragma section
  for(long long jj = 0; jj<M; jj+=16)
    for(long long ii = 0; ii<M; ii+=16)
      for(long long j = 0; j<16; j++)
        for(long long k =0; k<K ; k++)
          b_in[j][0].write(matB[(j+jj) * ldb + k]);
  for(long long jj = 0; jj<M; jj+=16)
    for(long long ii = 0; ii<N; ii+=16)
      for(long long i = 0; i<16; i++)
        for(long long k =0; k<K ; k++)
          a_in[0][i].write(matA[k * lda + i+ii]);
#pragma section
  for(long long jj = 0; jj<M; jj+=16)
    for(long long ii = 0; ii<N; ii+=16)
      for(long long j=0; j<16; j++)
        for(long long i=0; i<16; i++) {
          double tji = matC[(j+jj)*ldc + i+ii];
          for(long long k=0; k<K; k++) {
            double aij = a_in[i][j].read();
            double bji = b_in[j][i].read();
            tji +=aij * bji;
              //no write from last row
            if (i != 15)
              a_in[i+1][j].write(aij);
              // no write from last column
            if (j != 15)
              b_in[j][i+1].write(bji);
          }
          matC[(j+jj)*ldc + i+ii]= tji;
        }
}
```

| Rotate method in C++ | Example that uses rotate |
|---|---|
| ```
csa::stream<T> back;
for (int r = 0; r < R; ++r)
  for (int i = 0; i < M; ++i) {
    int val;
    if (r != 0) val = back.read();
    else val = A[i];
    foo(val);
    if (r != R-1) back.write(val);
  }
``` | ```
#include "csastream.h"
//First, read once from memory
#pragma omp parallel sections
{
  #pragma omp section
    for (int i=0; i<M; i++)
      in.write(A[i]);
  #pragma omp section
    for (int r = 0; r < R; ++r)
      for (int i=0; i<M; i++) {
        val = in.rotate<M>(r, 0, R, 1);
        foo(val);
      }
}
``` |
| Rotate method in CSA assembly | |

```
.lic$128 .i64 $back #declares a LIC with 128 depth (M=128)
...
    cmpeq64      $first.if, r, 0
    filter64     $lic.val, $first.if, $loaded.A.i
    pick64 $val, $first.if, $back, $lic.val
    cmpeq64      $second.if, r, 3 #3 = R-1
    notl   $not.second.if, $second.if
    filter64     $back.val, $not.second.if, $val
    mov64 $back, $back.val
```

```
csa::stream<double> lic[3];
csa::stream<double> lic_one;
#pragma omp parallel sections
{
#pragma omp section
for(int ii = 0; ii<len; ii+=3) {
  for(int ii = 0; ii<3; ii++) {
    double val = src[ii+i];
    lic[ii].write(val);
  }
  merge(lic_one, lic);
}
#pragma omp  section
for(int i= 0; i<len; i++) {
    double val = lic_one.read();
    dest[i] = val;
}
}
```

```
csa::stream<double> lic[3];
csa::stream<double> lic_one;
#pragma omp parallel sections
{
#pragma omp section
for(int i = 0; i<len; i+=1) {
   double val = src[i];
   lic_one.write(val);
}
scatter(lic_one, lic);

#pragma omp section
for(int ii = 0; ii<len; ii+=3) {
  for(int ii = 0; ii<3; ii++) {
    double val = lic[ii].read();
    dest[i] = val;
  }
}
```

```
// multiple read sites              #include "csastream.h"
// are not allowed                  for (int i = 0; i < M; ++i) {
for (int i = 0; i < M; ++i) {          broadcast(in, consumer0, consumer1,
    //worker0                                     consumer2);
    consumer0.write(in.read());     }
    //worker1
    consumer1.write(in.read());
    //worker2
    consumer2.write(in.read());
}
```

```
// Original code
for (int j=Radius; j<N-Radius; j++) {
    double t = 0;
    for (int i=-Radius; i<=Radius; i++) {
        t += a[j+i];
    }
    b[j] = t;
}
// Pseudo-algorithm of the shift operation
T shift(T val, int range, int range_low, int range_high, int range_step, int
window, int window_low, int window_high, int window_step) {
    csa::stream<T, depth, pref_depth> back;
    T val2;
    // if window is at top, return original lic values
    // else return back_lic values
    if (window < window_high) {
        if (range == range_low)  val2 = this->read();
        if (range != range_low) val2 = back.read();
    }
    if (window == window_high) {
        val2 = val;
    }
    // if range is not at the end, write back the value for future use
    // first value is always thrown away
    if (window != window_low) {
        if (range != range_high) {
            back.write(val2);
        }
    }
    return val2;
}
//1D Stencil Data Reuse via the shift stream operation
int Diameter = Radius * 2;
csa::stream<double, Diameter - 1, Diameter - 1> lic;

for (int j = 0; j < Diameter - 1; j++) {
    lic.write(a[j]);
} for (int j=Radius; j<N-Radius; j++) {
    double t = 0;
    for (int i=-Radius; i<=Radius; i++) {
        t += lic.shift(
                a[j+i], j, Radius, N-Radius-1, 1, i, -Radius, Radius, 1);
    }
    b[j] = t;
}
```

INTEGRATION OF AUTOMATED COMPLIER DATAFLOW OPTIMIZATIONS

TECHNICAL FIELD

Embodiments described herein generally relate to optimizing dataflow in automated transformation frameworks.

BACKGROUND

In computing, control flow may be concerned with the possible order of operations (e.g., execution or evaluation of individual statements, instructions, or function calls), such as "precedence constraints" between the operations. Dataflow may be concerned with where data is being routed through a program or system and what transformations are applied to the data during the routing.

Traditionally, optimization of certain computing processes could be achieved in several ways. For example, a number of memory operations may be reduced and data reuse may be exploited by optimizing the number of registers on hardware architectures, such as microprocessors or graphics processing units (GPUs). In another example, parallel compilers may be designed and configured to optimize control-flow codes.

BRIEF DESCRIPTION OF THE DRAWINGS

FIG. 2A illustrates a first example of code.
FIG. 2B illustrates a second example of code.
FIG. 3A illustrates a third example of code.
FIG. 3B illustrates a fourth example of code.
FIG. 3C illustrates a fifth example of code.
FIG. 4A illustrates a sixth example of code.
FIG. 4B illustrates a seventh example of code.
FIG. 4C illustrates an eighth example of code.
FIG. 4D illustrates a ninth example of code.
FIG. 5 illustrates a tenth example of code.
FIG. 6B illustrates an eleventh example of code.
FIG. 10A illustrates a twelfth example of code.
FIG. 10B illustrates a thirteenth example of code.
FIG. 10C illustrates a fourteenth example of code.
FIG. 10D illustrates a fifteenth example of code.
FIG. 10E illustrates a sixteenth example of code.

DETAILED DESCRIPTION

Various embodiments are generally directed to optimizing dataflow in automated transformation frameworks (e.g., compiler, runtime, etc.) for spatial architectures (e.g., Configurable Spatial Accelerator) that translate high-level user code into forms that use "streams" (e.g., Latency Insensitive Channels, line buffers) to reduce overhead, eliminate or improve the efficiency of redundant memory accesses, and improve overall throughput.

As will be further described below, automated dataflow optimization may be achieved via at least two different sets of automated compiler transformations: (i) a series of enhancements to existing high-level loop transformation passes in a compiler for stream-awareness, which may extend the scope of the loop transformation passes in various ways and lead to better code generation for dataflow architecture instantiations, such as a Configurable Spatial Accelerators (CSA) and (ii) a novel data-flow-tasking optimization that transforms code written using at least a standard parallel-for-loop style into a form that separates the memory accesses into separate tasks in the computation, where the tasks may communicate with each other using a new dataflow construct that does not require memory accesses.

Spatial Architectures

Figure 1:
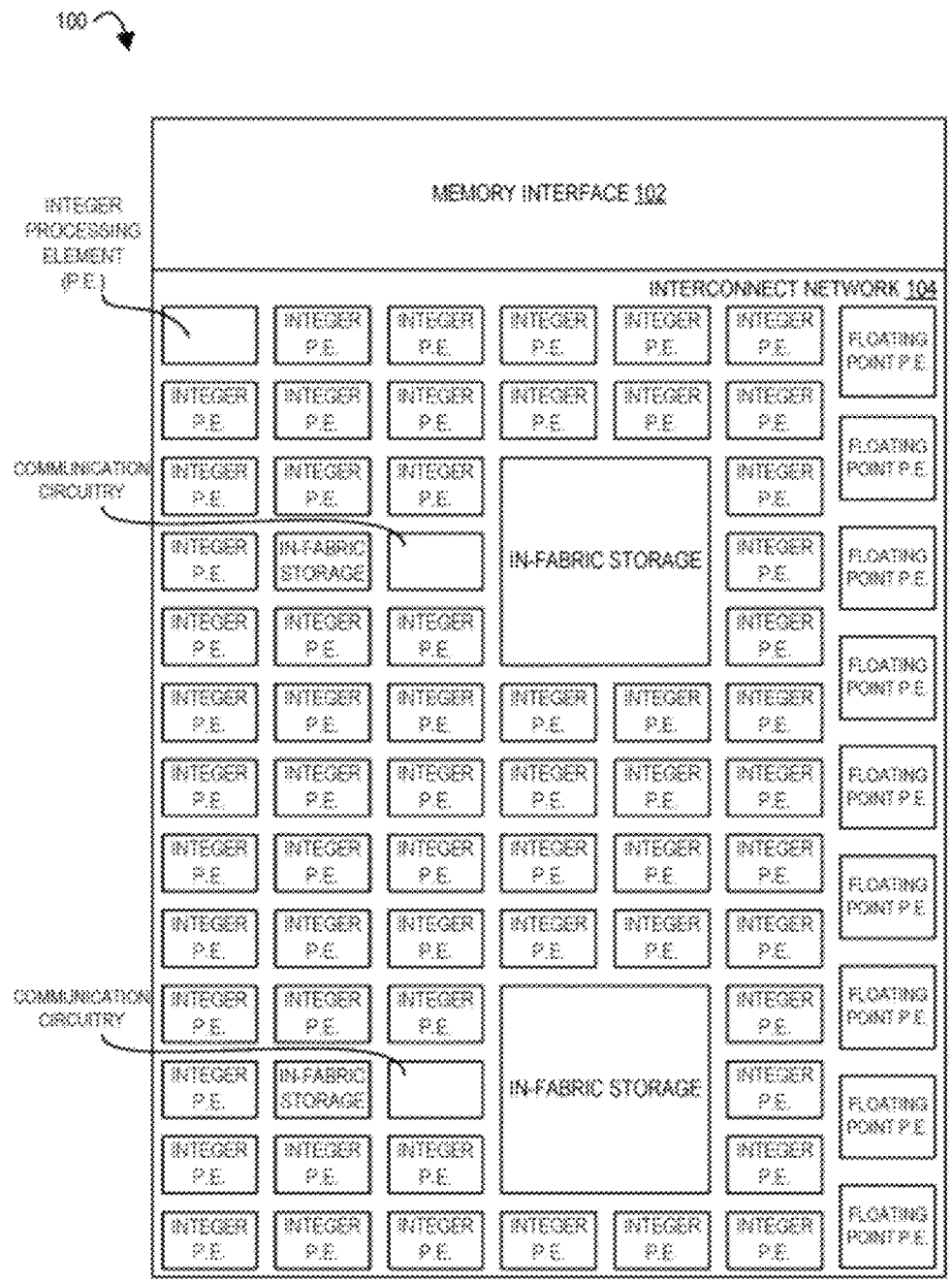
FIG. 1 illustrates an example CSA.

FIG. 1 illustrates an example Configurable Spatial Accelerator (CSA) 100 according to one or more embodiments of the disclosure. The architecture of CSA 100 is an example of a spatial architecture targeting the execution of dataflow graphs. It may be understood that the CSA 100 may be designed and configured to operate alongside a traditional x86 core, which allows the core to maintain legacy support and handle additional computing tasks that might be more efficient or easier on a traditional core.

As shown, the CSA 100 may be implemented in the form of a heterogenous array of processing elements (PEs) along with a memory interface 102 and an on-die interconnect network 104. The CSA 100 may be configured to execute a dataflow graph or graphs. A dataflow graph may generally refer to an explicitly parallel program description which arises in the compilation of sequential codes. The CSA 100 may allow dataflow graphs to be directly configured onto a CSA array, e.g., rather than being transformed into sequential instruction streams. The derivation of a dataflow graph from a sequential compilation flow allows embodiments of the CSA 100 to support familiar programming models and to directly execute existing high-performance computing (HPC) code with minimal modifications.

As illustrated in FIG. 1, memory interface 102 may couple to a memory to allow the CSA 100 to access (e.g., load and/store) data to the (e.g., off die) memory. The array of PEs may be heterogeneous, e.g., such that no PE supports the full CSA dataflow architecture and/or one or more PEs may be programmed (e.g., customized) to perform only a few, but highly efficient operations. The CSA 100 may include one or more of integer arithmetic PEs, floating point arithmetic PEs, communication circuitry, and in-fabric storage. In examples, for a particular dataflow graph, each PE may handle only one or two operations of the graph.

In the dataflow graph, communication arcs of the CSA may be referred to as Latency Insensitive Channels (LICs), which allow in-order, back-pressured, point-to-point communications. In examples, the LICs (along with other suitable types of buffers, such as line or data buffers) may be referred to as "streams" herein. Dataflow graph channels can be implemented in a pipelined fashion with no more than one cycle of latency. Moreover, a CSA compiler may be responsible for the control flow to dataflow conversion from imperative input languages (e.g., C, C++, Fortran augmented by parallel annotations).

A unique aspect of CSA architecture is that the total number of resources available in the dataflow fabric may be limited and, thus, careful consideration may be needed to fit large parallel loop bodies onto the CSA fabric. Currently, application programs rely on the compiler to optimize data reuse and to replicate work on multiple processing units inside the CSA. It may be understood that parallel loops on the CSA can be dynamically pipelined, e.g., later iterations can begin execution before previous iterations have completed. Efficient performance on the CSA may be achieved via the pipelined execution of loop bodies and physical replication of loop bodies, each of which gets pipelined. Compiler optimizations today, however, do not take full advantage of the CSA communication channels, which may lead to suboptimal code generation for the CSA. In order to generate optimal code for dataflow architectures, novel automated compiler transformations are described herein.

Automated Compiler Transformations

According to embodiments, enhancements to traditional compiler loop transformations may include: (i) for loop-nest patterns (may otherwise be referred to as nested loops herein) that include a short trip-count inner loop with a set of loads that are invariant with respect to an outer loop and further implement cyclic buffering that allows reuse of values from a stream reducing redundant memory accesses (e.g., extension of loop-invariant code motion), (ii) extension of loop-carried scalar replacement for handling stencil-like memory accesses in an inner-loop by rendering it workable on streams (e.g., going beyond loop-carried replacement of scalars) by using a rolling window of values, (iii) enhance complete unroll transformations for allowing stores and loads inside such unrolled loops to occur at a later time with unit-stride accesses using a stream, which may allow all the advantages of unrolling (such as the registering of other array accesses inside the loop) and simultaneously not pay any penalty from conversion to non-unit-stride accesses for the stores and loads, and (iv) enhance unroll and squash transformation using streams so that overhead from adding variable shifts and rotates are avoided.

According to further embodiments, a new compiler optimization may include automatically transforming one or more complex nested loops or loop-nests (such as matrix multiply or stencil computation) to a dataflow-friendly form that is more efficient for spatial architectures via a combination of: extraction of memory operations into streams, creation of concurrent pipeline-able tasks, and/or communication between these tasks using streams.

Advantages

The embodiments and examples described herein are advantageous for various reasons. For example, peak performance of the CSA architecture (and other related dataflow architectures) can be obtained for high performance computing (HPC) and non-HPC workloads. In another example, overall efficiency and portability can be achieved since the CSA compiler may automatically transform user programs written, for instance, in C, C++, Fortran with OpenMP annotations, DPC++, SYCL, OpenCL, etc., to create parallel pipeline-able tasks that use, for instance, intermediate representation (IR) streams. Accordingly, optimal data reuse and higher throughput may be obtained without changes to a program.

Enhancing Existing Compiler Loop
Transformations with Streams and Automatic
Dataflow Tasking Compiler Transformation As described above, LICs associated with the CSA may represent the communication arcs in the dataflow graph and may be used to communicate data between pipeline stages in various parallel tasks (e.g., loop-nests executing concurrently on the dataflow fabric).

According to one or more embodiments, at least three main built-ins may be implemented or used with one or more streams, e.g., "init," "read," and "write." For example, "int_builtin_csa_lic_init(sizeof(T), size_tdepth, size_t_pref_depth)" may create a LIC of type "T" and may initialize its depth to two sizes: depth that is the minimum buffer size to avoid deadlocks and yield correct results and "pref_depth" that represents an optimal size for performance. In another example, "void builtin_csa_lic_write(int lic, T value)" may insert a new element in the buffer. In yet a further example, "T builtin_csa_lic_read((T)0, int lic)" may remove a subsequent, e.g., next, element in the buffer.

The above described built-ins may be used to implement new stream-based operations in the compiler, such as rotate, merge, scatter, broadcast, and shift. In examples, rotate may be an operation to reduce number of memory operations by replicating data into the streams while loading them only once, merge may be a many-to-one operation that merges together the results of multiple streams and writes into one stream, scatter may be a dual operation of merge (e.g., one-to-many), broadcast may represent a communication between one producer and multiple consumers, shift may be an operation to maintain a rolling window of values, e.g., when one value is dropped at one end and a new one may be loaded at the other end each time a shift is performed. Details related to the stream-based operations—rotate, merge, scatter, broadcast, shift—are set forth in FIGS. 10A to 10E, respectively, and further described below.

It may be understood that all examples of code illustrated in the figures and described herein are presented in pseudo-code using a mix of C++ and various comments for ease of understanding. It may further be understood that transformations are performed inside the compiler as part of the loop optimization framework and operate on compiler intermediate representation (IR). In some examples, an example may list a larger region of code (such as a loop-nest) even though the compiler transformation modifies only a smaller region (such as a single innermost loop).

Enhancing Existing Compiler Loop
Transformations with Streams

As described above, enhancements to traditional compiler loop optimizations may be implemented to render them "stream-aware." In examples, the enhancements may broaden the scope of the traditional optimizations and further extend performance benefits via the use of extra storage available in a "stream" compared to a simple register. Thus, more values can be held or stored in streams during application execution in the dataflow fabric, which reduces overall number of memory accesses and renders memory accesses more efficient (e.g., by improving memory and cache bandwidth utilization).

In further examples, the enhancements may be integrated into existing high-level loop transformations in the traditional optimizing compiler in a straightforward manner. The high-level loop optimization framework in a traditional optimizing compiler typically analyzes affine memory accesses in terms of surrounding loop indices. Moreover, parallelism exposed in the loops may be analyzed, which may then be translated into dynamically pipelined loops (e.g., when targeting a dataflow architecture) based on information associated with lack of loop-carried dependences (e.g., the information may be provided by a user, the information may be derived based on compiler auto-parallelization analysis in this framework).

For each compiler transformation described below, it may be understood that a kernel loop-nest may be used. It may further be understood that in following examples (e.g., based on source code originally written by a user in C++), a user may express the parallelism in multiple levels of the loop-nests via "OpenMP parallel for" annotations, where the annotations are captured by the pseudo-code as "loop marked parallel" comments on each such loop. The traditional optimizing compiler may use the annotations to perform dynamic pipelining of loops in the dataflow architecture, which can then take advantage of streams, thus allowing for higher reuse of values and leading to better optimization of memory accesses in the program.

(i) Cyclic Buffering to Allow Reuse of Values From a Stream Reducing Redundant Memory Accesses According to one or more embodiments, cyclic buffering may involve using a buffer to circulate data, where a first flow of data may be extracted or pumped from memory. Thereafter, the same data may be reused multiple times without additional memory operations. In traditional programming and compiler optimizations, the aforementioned buffer may be an array residing in memory. Using a stream extension, however, no redundant accesses or trips to the memory are needed since the stream buffer effectively acts as storage.

In examples, a common pattern in application codes may be a nested loop (or loop-nest) that has a short trip-count innermost loop with a set of loads (e.g., dependent on the innermost loop-index) that are invariant with respect to an outer loop (e.g., potentially with a large trip-count). It may be understood that a trip-count may refer to a minimum number of times a loop executes or is invoked. If the innermost loop is not completely unrolled by the compiler, then there may be redundant memory accesses that can strain cache and memory subsystems and consequently degrade performance. In further examples, a QCD benchmark (e.g., kernel that captures the hotspot for a large complex C++ application) contains within its main computation a multi-level loop-nest where an inner mu-loop reads a set of nine values from a "U" array, and that set of values is re-read for each iteration of the outer "s" loop.

FIG. 2A illustrates an example of code 200 according to one or more embodiments of the disclosure. As shown, the "c1" and "c2" loops may be fully unrolled by the compiler and, thus, exposing 72 accesses of the U array in every "s" loop iteration. If the "mu" loop had also been completely unrolled, scalar replacement of array values may convert the U array references into scalar references that may be removed from the "s" loop. The body of the "mu" loop, however, may be too large for complete unrolling and scalarization becomes inapplicable.

FIG. 2B illustrates an example of code 220 according to one or more embodiments of the disclosure. As shown, by loading the values of U needed in each "s" loop iteration into streams (or high-level LICs), it is possible to recirculate the values in the LICs within the "mu" loop, for instance, eight times. It may be understood that a different value stored in the LIC is used in every iteration of the mu-loop, where the rotation ensures that there will only be one read-site from the stream. For example, there may be nine streams (e.g., nine LICs), one corresponding to each "c1"-"c2" pair. To at least that end, loop-invariant code motion of a large block of values may be achieved. In the code 220, the U value may be read into LICs upon being outside the "s" loop (but still inside the "site" loop) and reused within the "mu" loop.

It may be understood that U has datatype "ComplexD" and the built-in stream may support values for datatype double and other primitive types such that real and imaginary parts of U elements are handled separately. Moreover, a "rotate" function (see FIG. 10A and corresponding description below) may effectively return a value from the stream and, for each value of "s" for zero to "Ls," the value in the stream for future reuse may be retained. Accordingly, the overall number of U loads may be reduced by a factor of Ls, which promotes improved cache bandwidth utilization and efficiency.

In examples, an additional analysis in the stream-aware rotation transformation may be to identify loop-invariance of a set of memory accesses in a loop-nest based at least in part on the use of loop-indices and the loop-carried data dependence analysis used to prove invariance across an outer loop. It may be understood that there may be inner loops (such as in the c1 and c2 loops) that can be completely unrolled by the compiler so that a separate stream can be used for each such unrolled instance. The set of values that may be written into a single stream and get rotated may fit into a length of the stream.

As illustrated in FIG. 2B, the above compiler code transformation may thus involve creating a loop-nest (or loop) at an appropriate loop-hierarchy to load values from memory (avoiding any redundancy) and writing into a LIC. The new loops can be marked with parallel annotations by the compiler to enable dynamic pipelining. Moreover, it may involve modifying the original loop-nest that has the redundant memory accesses to read the values from the corresponding LICs and to rotate the values for successive iterations of the outer-loop and further ensuring that the newly created loop (L1) and the original loop (L2) are marked as parallel tasks (with appropriate IR annotations) so that the loops can execute concurrently. It may be understood that the write-read dependences through the stream may be observed based on dataflow semantics of execution of the tasks.

(ii) Extensions to Loop-Carried Scalar Replacement Transformation

Traditional loop-carried scalar replacement of references may reduce the total number of memory accesses by converting array references to scalar references, which may serve as an important optimization technique for any architecture, such as stencil codes where there may be numerous memory accesses that get repeated from one iteration of the loop to the next. For example, the values from one iteration to the next may be kept in registers and the next iteration may reuse the value from the register instead of from memory.

FIG. 3A illustrates an example of code 300 according to one or more embodiments of the disclosure. As shown, the original loop before scalar replacement is set forth on the top and the transformed loop after scalar replacement is set forth on the bottom. As further shown, all of the scalar-replaced array references may be explicit in the loop so that each memory access can be changed to use a scalar. In some instances where loads originate from a different inner-loop (e.g., which has to be completely unrolled first to make all memory accesses explicit), the scalar replacement may not occur unless the inner-loop is completely unrolled.

FIG. 3B illustrates an example of code 320 according to one or more embodiments of the disclosure. As shown, for example, scalar replacement is not performed by the compiler when the store statement is replaced by an inner-loop.

FIG. 3C illustrates an example of code 340 according to one or more embodiments of the disclosure. As shown, the code 340 is an application of a shift operation (see FIG. 10E and corresponding description below) in, for instance, one-dimensional (1D) stencil. In some example dataflow architectures, the loop-carried scalar replacement may be applied to streams (as opposed to scalars) by using a rolling window of values. For example, at each output position, one input value used in the previous position may be dropped and a new value may be loaded from memory. To at least that end, one input value may be shifted out/in for each point computed. Advantageously, the foregoing compiler transformation enhancement allows the reduction in memory accesses (as in traditional scalar replacements), but without requiring the complete-unroll of the inner-loop.

As described above, a traditional compiler may be capable of reducing the overall memory accesses by applying loop-carried scalar replacement optimization if the inner-most k-loop (over the window) is fully unrolled. The use of streams, however, advantageously enables the same optimization without requiring unrolling of the k-loop. By leaving the inner loop as-is, the outer loop may be unrolled to a greater degree, which allows higher overall computing performance and better resource usage in the same graph space for a dataflow architecture. In addition, the outer-loop unrolling spreads out the memory accesses to different cache-lines in every cycle and can lead to better memory subsystem utilization that translates to higher performance.

(iii) Complete-Unroll Transformation Enhancement to Generate Stores and Loads

According to one or more embodiments, for one or more memory-access patterns in a nested loop (or loop-nest), unrolling an inner loop completely inside an outer loop may create a non-unit stride in memory accesses across outer-loop iterations. Thus, this stride may disable the generation of streaming memory operations in architectures that may require unit-strided accesses. It may be understood that a stride may refer to a stride of an array (which may also be referred to as an increment, pitch, or step size), which is the number of locations in memory between beginnings of successive array elements and measured in units (e.g., bytes) of the size of the array elements; for instance, an array with stride of exactly the same size as the size of each its elements may be contiguous in memory and may be referred to having a unit-stride or being unit-strided. In examples, the implementation of a stream and streaming accesses improves performance by maximizing memory bandwidth utilization. In CSA architecture, for instance, a scalar store operation may lead to execution of one store for every two cycles, whereas a store operation using the stream may lead to execution of two stores for every three cycles.

In one example, a merge operation combining results of multiple streams into a single stream (see FIG. 10B and corresponding description below) may be used to convert the non-unit strided accesses to unit strided accesses by communicating streams between two loops, as will be described below. Thus, the merge operation, in examples, allows the compiler to perform the complete unrolling of loops (as is done in traditional compilers), but further improves the process via the use of streams to improve memory bandwidth.

FIG. 4A illustrates an example of code 400 according to one or more embodiments of the disclosure. As shown in code 400, a "hot" loop is included in a "kmeans" benchmark and a value of "BLOCK_FACTOR" may be 64. A core compute may occur in the middle i-loop (e.g., "numFeatures" loop) and thereafter final values may be stored into an "inner_product" array in a last "rowIndex" loop that may be completely unrolled by 64. An outermost k-loop may be marked as parallel and may have a call to the function "InnerProductAllNoMallocNoXScaleICXCSA( )" that may get in-lined by the compiler. The core compute may be in the i-loop that contains an inner "rowIndex" loop that gets completely unrolled by the compiler resulting in a set of 64 sum-reductions. A store-loop that stores the reduced values into the inner_product array may then follow.

FIG. 4B illustrates an example of code 420 according to one or more embodiments of the disclosure. Using the above described merge operation, the last innermost loop, which is labeled "Loop 10" (code at the top), may be optimized by the compiler to perform or execute the code shown at the bottom.

In the bottom code 420, the complete unrolling of "Loop 10_1" (by a factor of 64) still occurs, but the values are written to a stream array (e.g., LIC array) instead of performing the stores directly. Thus, at least the values from the LIC arrays, for instance, are all "merged" to create a single LIC and in a following (e.g., pipelined) "L10_2 loop," the values may be stored by reading from the single LIC. In at least that regard, the stores may now be unit-strided in the loop and the loop is not unrolled, which leads to streaming-store bandwidth maximization.

FIG. 4C illustrates an alternative example of code 440 according to one or more embodiments of the disclosure. In an alternate formulation illustrated in code 440, the compiler transformation may determine to create a set of store-loops, each of which may lead to a single streaming-store operation by partitioning the iteration space into two (or four, or eight, etc.) blocks, as shown.

The code 440 thus allows multiple streaming-store operations to execute in every cycle (using different functional units in the dataflow fabric). In examples, the determination of how many loops (e.g., merged streams) to use may also account for a number of individual elements stored by each instantiation of a loop to ensure each loop instance covers the full cache line.

FIG. 4D illustrates yet another example of code 460 according to one or more embodiments of the disclosure. Based on a scatter operation (see FIG. 10C and corresponding description below), a similar but different technique may be used to convert a non-unit stride memory load loop into a unit-stride memory load loop, as shown in the two columns illustrated in code 460 of FIG. 4D. For example, the left column shows the non-unit stride that is being converted to unit-stride (right column).

Accordingly, as set forth above, the complete-unroll transformation performed by the compiler loop optimization framework may be enhanced or modified to perform the above described additional transformations via streams to improve bandwidth through the generation of streaming memory operations, e.g., streaming loads and stores.

(iv) Unroll-and-Squash: Vector Multiply

According to one or more embodiments, "unroll-and-squash" may be an alternative optimization technique to "unroll-and-jam." For example, in unroll-and-squash, instead of creating multiple copies of a loop body, a number of different outer loop iterations and inner loop iterations may be executed in parallel via pipelining.

Because the usual implementation of the compiler transformation necessitates adding variable shifts and rotates and creating prolog and epilog code outside the inner loop, the additional logic may introduce a loop carried dependency and can have extra overhead on dataflow architectures. An implementation via streams, however, is more efficient since it allows a direct mapping to hardware and does not introduce extra dependencies.

Figure 5:
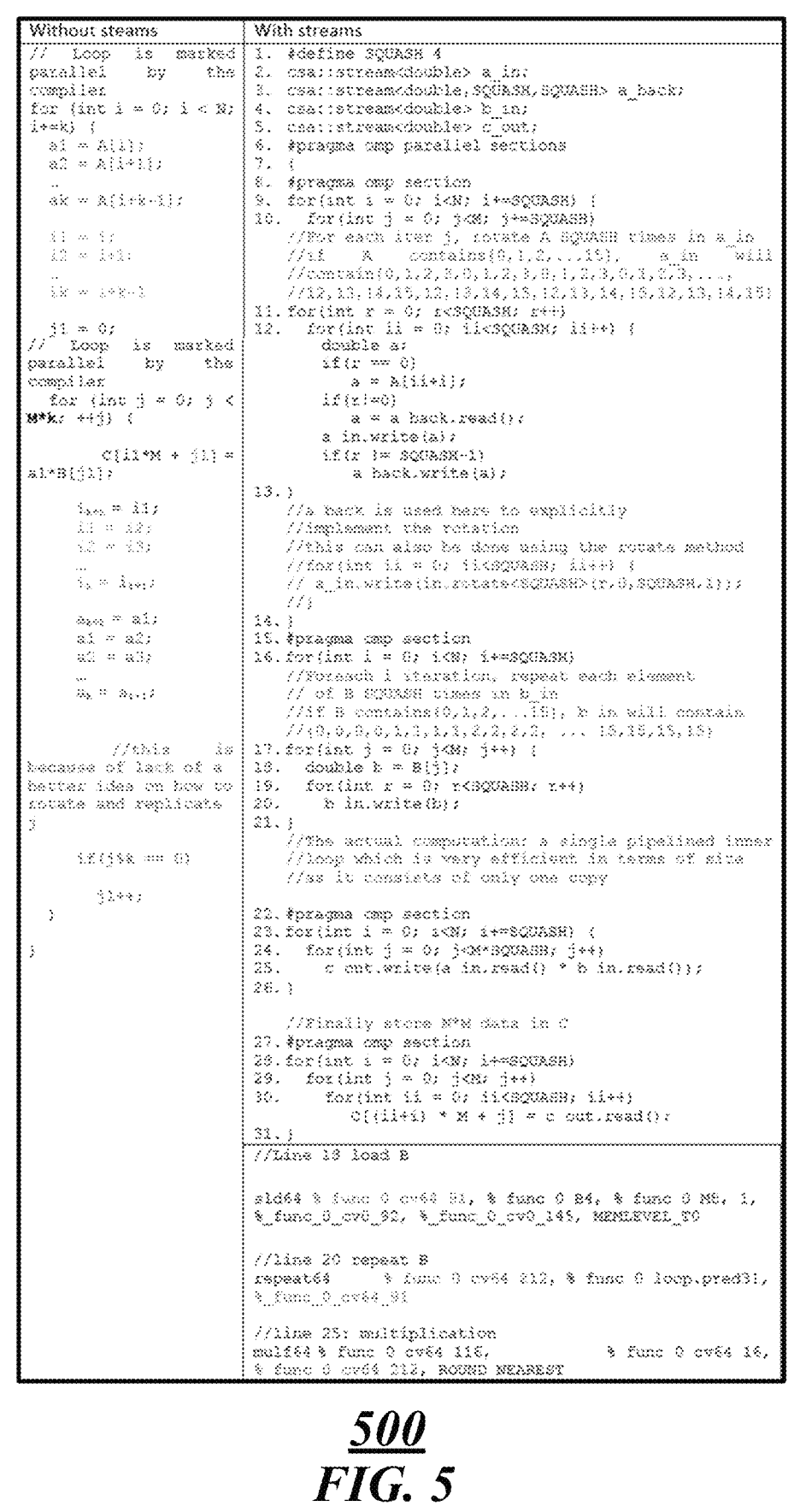

FIG. 5 illustrates an example code 500 according to one or more embodiments of the disclosure. For ease of explanation, a simple vector multiply example is provided in code 500 that shows the original code and both implementations with and without streams. As shown in the code 500, the left-hand column illustrates code without streams and the right-hand column illustrates code with streams. The original code may be as follows:

```
for (int i = 0; i < N;++i) {
    for (int j = 0; j < M; ++j) {
        C [i*M+j] = A[i]*B[j];
    }
}
```

Automatic Dataflow Tasking Compiler
Transformation

According to one or more embodiments, a new stream-based compiler transformation may be implemented. In order to maximize portability and code reuse, a novel optimization pass may automatically transform code to use streams. For example, memory operations may be extracted into streams, then concurrent pipeline-able tasks may be created, which can communicate among each other via the streams. A pseudo algorithm for the novel transformation along with applications to double-precision general matrix-matrix multiplication ("dgemm") and stencils (e.g., 1D, 2D) will be further described below.

(i) Pseudo Algorithm

In examples, distribution design choices include distribution of input elements among the CSA processing units via replication using unrolling. For instance, if a kernel consists of a two-dimensional loop that performs a fused multiply-add (FMA) computation, because there may be a total of 256 FMAs on the CSA, one design choice may be the creation of 16×16 sites (e.g., processing elements) or "workers," where each loop may be unrolled 16 times (e.g., "unroll factor" may thus be considered 16×16). This example design can be fully performed by the compiler using a specific cost model or via a user regarding how to replicate the kernel.

In further examples, data may be created and loaded into streams. Memory operations may be extracted and loaded in the kernel to a new loop. Based at least in part on the above distribution design choice, streams for each of these memory operations may be created. For instance, the stream may be an array having any suitable dimension, e.g., dimension corresponding to a degree of unrolling performed. In further instances, for each dimension, the number of elements may be identical to an unroll factor. In a dgemm example and as will be further described below with respect to FIB. 6B, two outer loops may be unrolled so that "matB" may be loaded in "b_in[16][0]," which renders a stream "b_in" as two dimensions. Moreover, the load loop may use the same loop-nest ranges as the original loop, and further, unrolling may be applied on the load loop.

In yet further examples, computation may be performed. For instance, the original loop may be updated to use the streams instead of conventional memory operations. In instances where the kernel has multiple computations that feed each other, the multiple computations in the same loop may also be decoupled and put into multiple loops. Each computation, a left-hand side (LHS) of the equation may be put into a stream and the right-hand side (RHS) of each subsequent loop computation may read from the previous loop stream.

In additional examples, data reuse and communications may be performed. In one example, data reuse between the workers and computation done inside each worker may be applicable to dgemm and a second dimension of a two-dimensional (2D) stencil. In dgemm, for instance, the data reuse may be achieved via sweeping the data along the column for "matB" and along the row for "matA." Thus, the unrolled loop of 16 iterations in FIG. 6B along the column may be omitted. The entire computation, however, may be performed within each worker so there is no communication of partial results between workers. In the 2D stencil, for instance, calculations may be performed in an identical manner in the second dimension where the partial results are kept within each worker. In a second example, data reuse within each worker (e.g., broadcast) and computation communicated between workers may occur in a first dimension of the 1D and 2D stencil, where each worker performs an FMA and sends its result to the adjacent worker.

In yet more examples, the results may be created and stored into streams. Any store operations may be extracted, and an additional loop may be added to either store the data or communicate the data to a different subsequent kernel. In instances, the loop may use identical ranges as the loop involved in the indexes of the original store operation.

(ii) Application to dgemm

Figure 6A:
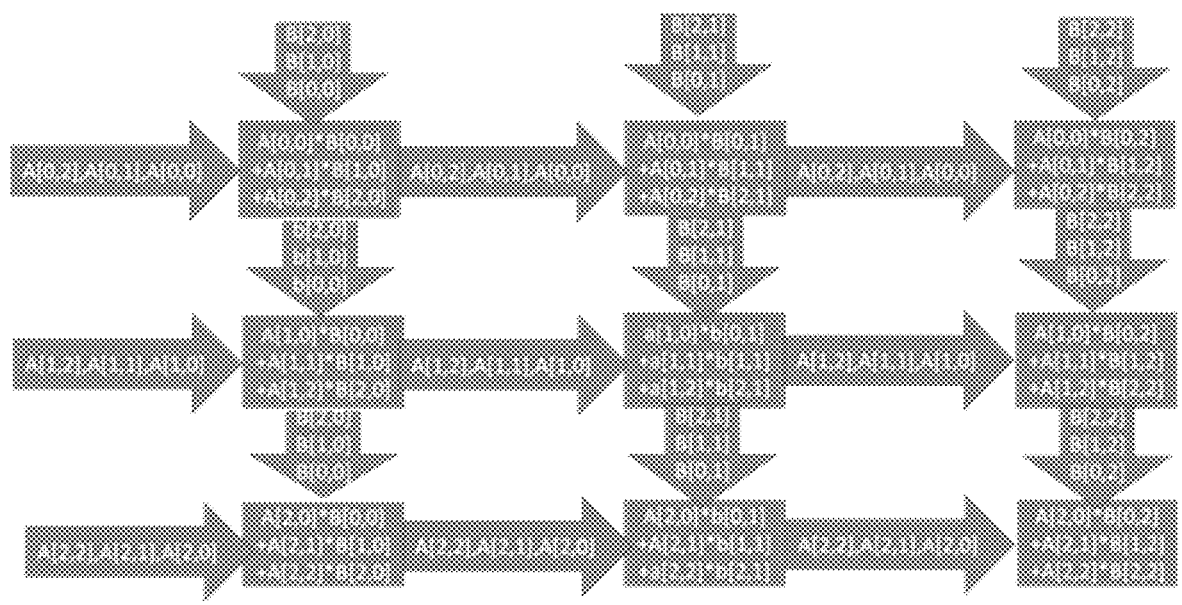
FIG. 6A illustrates an example systolic implementation of dgemm.

FIG. 6A illustrates an example systolic implementation 600 of dgemm according to one or more embodiments of the disclosure. As shown in the systolic implementation 600, the systolic dgemm may include at least nine FMAs, where the boxes may represent or indicate computations and the arrows may represent or indicate communications.

In examples, the systolic implementation 600 of dgemm using streams may include the distribution of input elements to the FMAs of the array units while coordinating data communication among the array units to at least increase throughput and reduce memory operations.

Various configurations of replication through unrolling may be implemented or used. In first example, the unrolling of two outer loops "j" and "i" may result into processors being arranged in a 2D grid. If the unroll factor is 16×16, the number of resulting FMAs may be 256. In a second example, in addition to unrolling of "Loop j" eight times and "Loop i" eight times, the inner most "loop k" may be unrolled four times to have a chain of four reductions, which may result in four grids with 256 parallel FMAs.

FIG. 6B illustrates an example of code 620 according to one or more embodiments of the disclosure. The code 620 represents at least a dgemm implementation using 16×16 replication. The code 620 may also be written or configured to reduce the number of memory operations. For example, a rotate operation to the "matB" stream may be added to load data only once for multiple CSA tiles. Thereafter, unroll-and-squash 4×4 optimization on both j and i dimensions may be applied to interleave the outer loop iterations and hide the inner loop reduction latency (e.g., 16 cycles for 4 FMAs).

(iii) Applications to Stencils

Figure 6C:
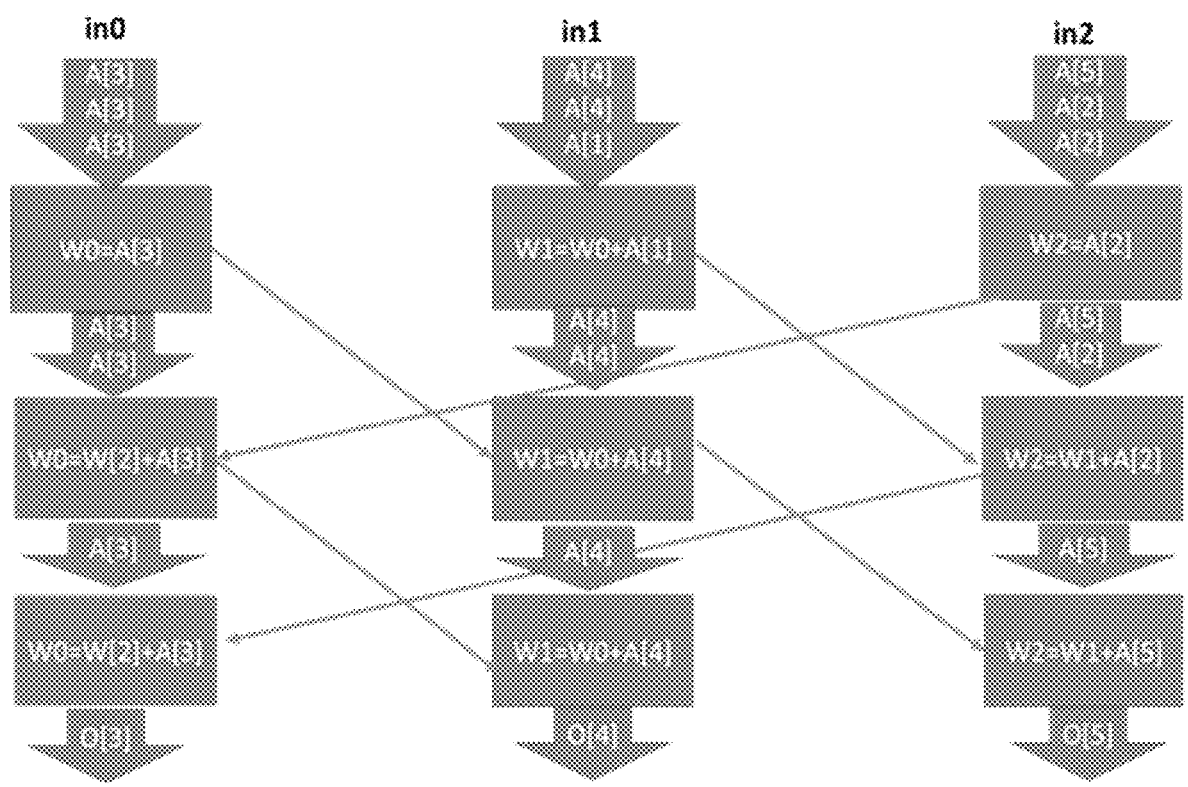
FIG. 6C illustrates an example systolic implementation of a first dimension.

FIG. 6C illustrates an example systolic implementation 640 of a first dimension according to one or more embodiments. The systolic implementation 640 may be a systolic 1D stencil where the radius is one and diameter is three (e.g., number of workers is three). As shown, data may be loaded in a cyclic manner into three worker streams, e.g., "in0," "in1," "in2." In examples, a broadcast communication may occur inside each worker such that no data is communicated between workers, but partial results may be communicated, as shown by the arrows.

According to embodiments, the above described novel algorithm can be applied to stencils so as to decouple memory operations from calculations and further to utilize streams for storing the input data. While the data is read once by the workers in a distributed manner, streams may be used to communicate and update the data. In at least this regard, the same data can be broadcasted via different CSA PEs. Moreover, by pipelining the stencil computations, in each cycle, different data elements may be processed at different PEs.

Figure 7:
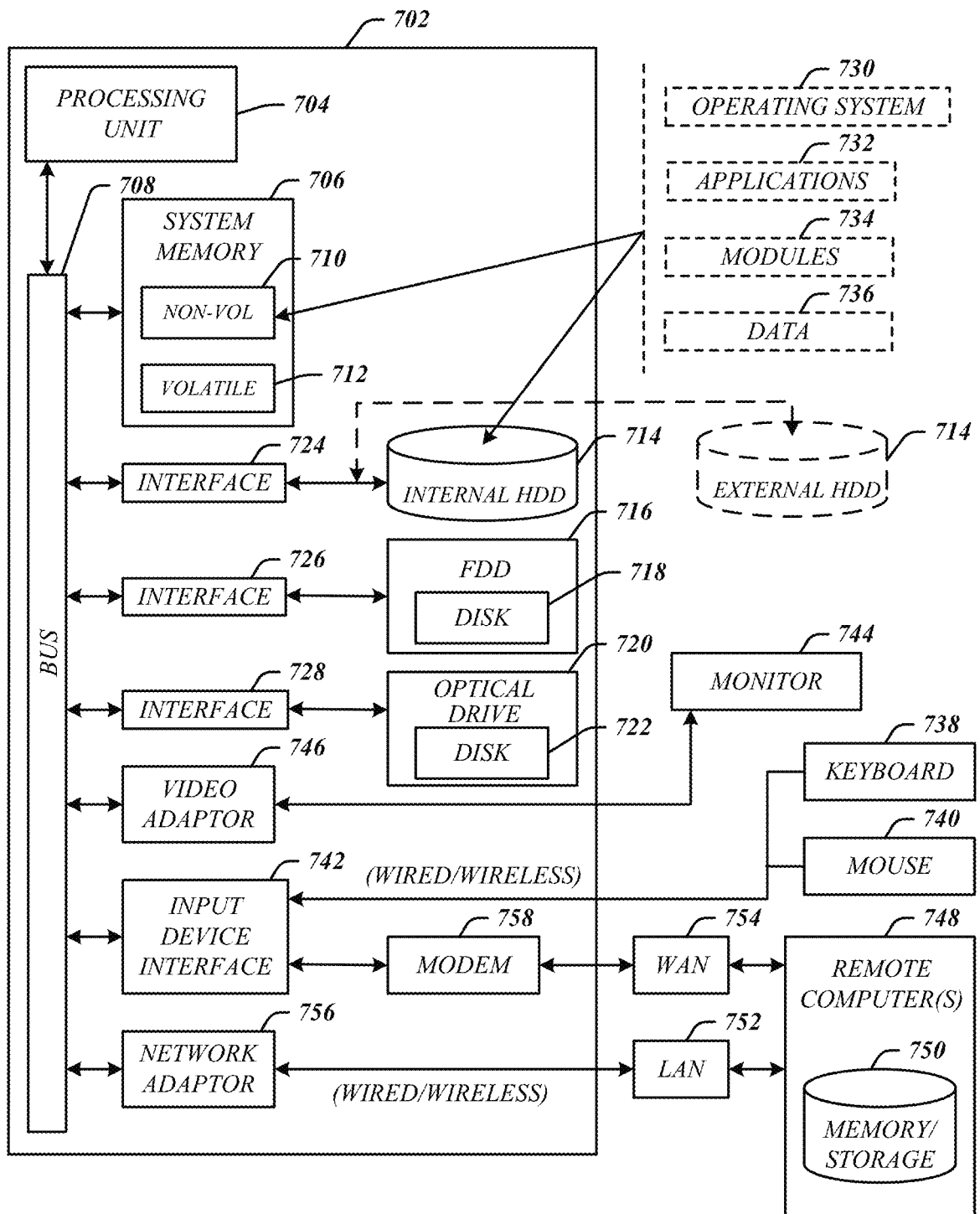
FIG. 7 illustrates an example computing architecture.

FIG. 7 illustrates an example computing architecture 700, e.g., of a computing device, such as a computer, laptop, tablet computer, mobile computer, smartphone, etc., suitable for implementing various embodiments as previously described. Moreover, the computing device may be a computing device in a data center (e.g., server infrastructure, virtualized server infrastructure) and/or may be a cloud-based computer in cloud computing environments. In one embodiment, the computing architecture 700 may include or be implemented as part of a system, which will be further described below. In examples, one or more computing devices and the processing circuitries thereof may include or support a plurality of microprocessors along with CSAs.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in this figure, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 700.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of computing device may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
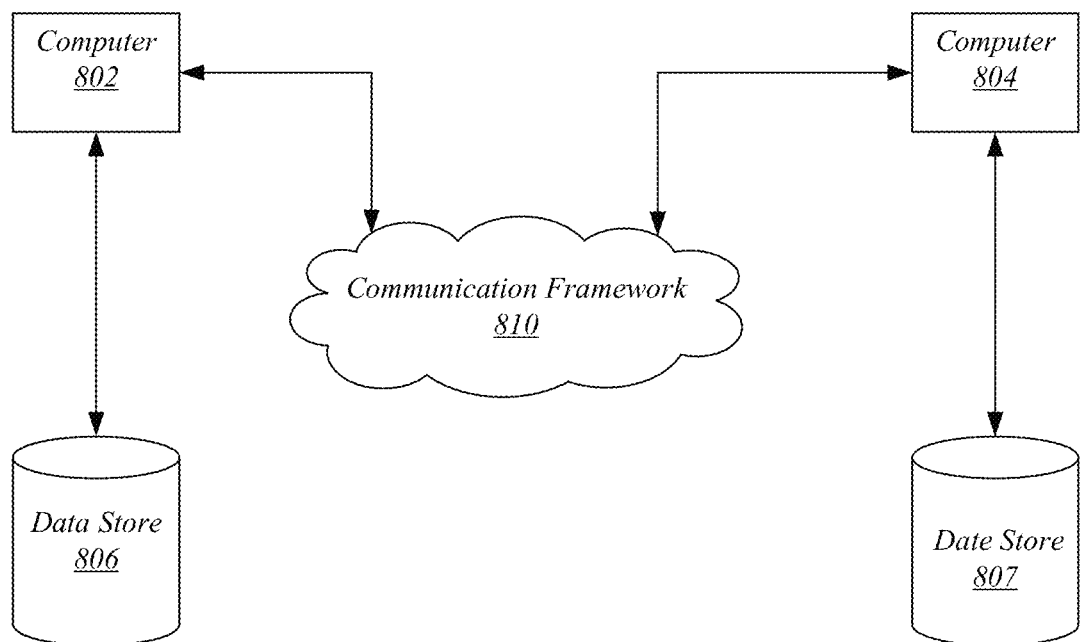
FIG. 8 illustrates an example communications architecture.

FIG. 8 illustrates an exemplary communications architecture 800 suitable for implementing various embodiments. For example, one or more computing devices may communicate with each other via a communications framework 810.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes a computer 802 and a computer 804, which are operatively connected to one or more respective client data stores 806 and 807 that can be employed to store information local to the respective computers 802 and servers 804, such as cookies and/or associated contextual information. Furthermore, computers 802 and 804 may be like, or include features like, computing architecture 700.

Computers 802 and 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computers 802 and 804. A communications network may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
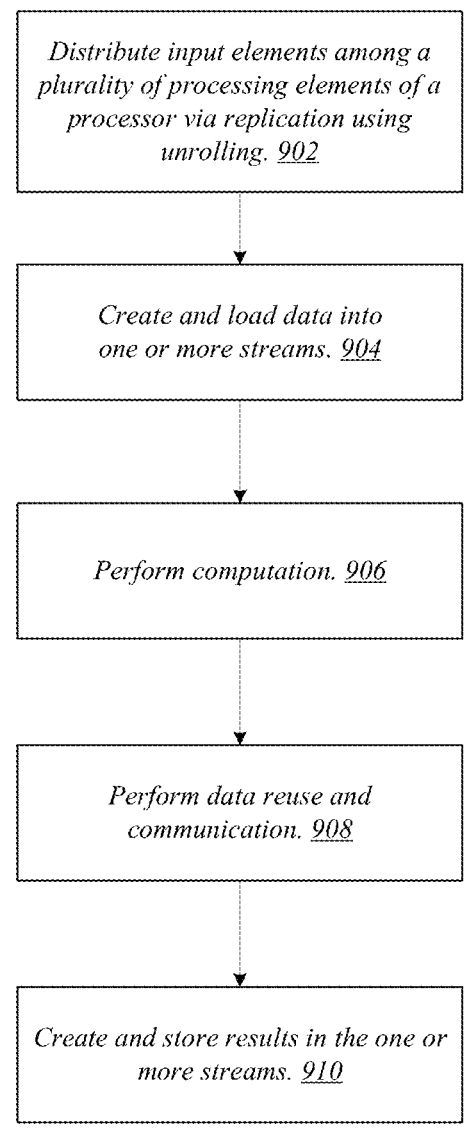
FIG. 9 illustrates an example flow diagram.

FIG. 9 illustrates an example flow diagram 900 according to embodiments of the present disclosure. The flow diagram 900 represents the flow of the novel complier optimization pseudo-algorithm described above. In examples and as will be described below, the algorithm may automatically transform code (e.g., complex loop-nests, such as matrix multiply or stencil computation) to a dataflow-friendly form that may be more efficient for spatial architectures by extracting memory operations into streams, creating concurrent pipeline-able tasks and communication between the tasks using the steams. As a result, advantageously, throughput and efficiency may be increased while memory operations may be reduced. It may be understood that the features described in each block may be executed by a processing circuitry, processing elements (PEs) of one or more CSAs, and further, it may be understood that the blocks are not required to be performed in any specific order.

At block 902, input elements may be distributed among CSA processing elements or units via replication using an unrolling procedure. As described above, the features associated with block 902 is related to distribution design choices and the design may be implemented by the compiler based on a specific cost model or by user input on ways to replicate a kernel.

At block 904, data can be created and loaded into one or more streams (e.g., LICs) of the CSA architecture. As described above, memory operations may be extracted to be loaded into the kernel to a new loop and further streams may be created for each of the extracted memory operations. In examples, each stream may be an array of a predefined dimension.

At block 906, computation may be performed. The original loop is updated to use the streams created at block 904 instead of the memory operations. As described above, in instances where the kernel has multiple computations that feed each other, block 906 may decouple the multiple computations originally in the same loop and put them into multiple loops.

At block 908, data reuse and communication may be performed. As described above, depending on the communication pattern between the workers, data reuse may be performed between the workers and computation may be performed inside each worker. In another instance, data reuse may be performed within each worker and the computation may be communicated between workers.

At block 910, the results are created and stored in the streams. Moreover, store operations may also be extracted if there are any. Moreover, at block 910, an additional loop to store the data or communicate the data may be added to a different subsequent kernel.

FIG. 10A illustrates an example of code 1000 according to one or more embodiments of the disclosure. The code 1000 represents an example rotate operation for CSA streams. For example, the rotate operation is useful to reduce number of memory operations by replicating data into the streams while loading them only once. As shown in code 1000, an array "A" of length "M" may be repeatedly accessed inside an outer r-loop. An intermediate buffer back with a minimum depth "M" may be used to contain the replicated data as shown on the left. As such, the high-level method rotate added to the C++ header file may be used, as shown on the right.

FIG. 10B illustrates an example of code 1020 according to one or more embodiments of the disclosure. The code 1020 represents an example merge operation for CSA streams. For example, the merge operation may be a many-to-one operation that merges together and writes the results of multiple streams into one stream. It may be understood that the streams involved in the merge may have a same dynamic depth. Moreover, the input streams may be specified as an array or variadic arguments and the merging may be performed in-order. As shown in code 1020, "lic_one" may receive one value from "lic[0]," one value from "lic[1]," one value from "lic[2]," and thereafter may iterate to get value from "lic[0]" again.

FIG. 10C illustrates an example of code 1040 according to one or more embodiments of the disclosure. The code 1040 represents an example scatter operation for CSA streams. For example, scatter may be a dual operation of merge (one-to-many). It may be understood that the input stream dynamic depth must be a multiple of the number of the output streams. The output streams may be specified as an array or variadic arguments and the scatter may also be performed in-order. As shown in code 1040, scatter distributes the data of one stream "lic_one" into multiple streams "lic[3]" value by value. It may further be understood that the output argument may be specified as the second argument in scatter.

FIG. 10D illustrates an example of code 1060 according to one or more embodiments of the disclosure. The code 1060 represents an example broadcast operation for CSA streams. For example, broadcast may represent a communication between one "producer" and multiple "consumers," where the multiple consumers may obtain the same value for each instance. As shown in code 1060, the broadcast operation may be implemented using read/write primitives.

FIG. 10E illustrates an example of code 1080 according to one or more embodiments of the disclosure. The code 1080 represents an example shift operation for CSA streams. For example, a shift operation may be used to maintain a rolling window of values, e.g., one value is dropped at one end and a new one is loaded at the other end each time a shift is performed. As shown in code 1080, if the stencil window size is "diameter," a LIC size of "diameter−1" may be used to transfer values from one output position to be used in the next position. Further shown in code 1080, the first set of loops "primes" the LIC with values needed at the first position. The second set of loops perform the computation shifting the values in the LIC. It may be understood that the parameters of the shift function define the range of the output array and the size of the stencil window.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1. An apparatus for automated compiler transformations, the apparatus comprising: one or more processors, each processor comprising a plurality of processing elements, the one or more processors operable to cause a compiler to: use cyclic buffering for one or more nested loops to allow reuse of values from one or more streams associated with the one or more processing elements; or perform one or more memory accesses in an inner loop via the one or more streams based on a rolling window of values; or allow one or more memory operations associated with an unrolled loop to occur at a later time with at least one unit-stride access via the one or more streams; or perform an unroll-and-squash procedure via the one or more streams.

Example 2. The apparatus of example 1, wherein the one or more processors are configurable spatial accelerators (CSA).

Example 3. The apparatus of example 1, wherein the compiler is a CSA optimizing complier.

Example 4. The apparatus of example 2, wherein the one or more streams is a latency insensitive channel (LIC) associated with communication among the one or more processing elements of each of the one or more CSAs.

Example 5. The apparatus of example 1, wherein the cyclic buffering comprises using the one or more streams to circulate data without any redundant trips to memory and wherein the one or more nested loops includes an inner loop with a short trip-count.

Example 6. The apparatus of example 5, wherein the data is circulated via a rotate operation.

Example 7. The apparatus of example 1, wherein the memory accesses associated with the performance of the one or more memory access includes stencil-based memory accesses.

Example 8. The apparatus of example 1, wherein the rolling window of values comprises, at each output position, an input value used in a previous position is dropped and a new value is loaded from memory.

Example 9. The apparatus of example 8, wherein the rolling window of values comprises performing a shift operation.

Example 10. The apparatus of example 1, wherein the one or more memory operations include stores and loads and the allowance of the one or more memory operations is based at least in part on a merge operation or a scatter operation.

Example 11. A system comprising the apparatus of any one of examples 1 to 10.

Example 12. At least one machine-readable storage medium for automated compiler transformations comprising instructions that when executed by at least one processor, the processor comprising a plurality of processing elements and operable to cause a compiler to: use cyclic buffering for one or more nested loops to allow reuse of values from one or more streams associated with the one or more processing elements; or perform one or more memory accesses in an inner loop via the one or more streams based on a rolling window of values; or allow one or more memory operations associated with an unrolled loop to occur at a later time with at least one unit-stride access via the one or more streams; or perform an unroll-and-squash procedure via the one or more streams.

Example 13. The at least one machine-readable storage medium of example 12, wherein the one or more processors are configurable spatial accelerators (CSA).

Example 14. The at least one machine-readable storage medium of 12, wherein the compiler is a CSA optimizing complier.

Example 15. The at least one machine-readable storage medium of example 13, wherein the one or more streams is a latency insensitive channel (LIC) associated with communication among the one or more processing elements of each of the one or more CSAs.

Example 16. The at least one machine-readable storage medium of example 12, wherein the cyclic buffering comprises using the one or more streams to circulate data without any redundant trips to memory and wherein the one or more nested loops includes an inner loop with a short trip-count.

Example 17. The at least one machine-readable storage medium of example 16, wherein the data is circulated via a rotate operation.

Example 18. The at least one machine-readable storage medium of example 12, wherein the memory accesses associated with the performance of the one or more memory access includes stencil-based memory accesses.

Example 19. The at least one machine-readable storage medium of example 10, wherein the rolling window of values comprises, at each output position, an input value used in a previous position is dropped and a new value is loaded from memory.

Example 20. The at least one machine-readable storage medium of example 19, wherein the rolling window of values comprises performing a shift operation.

Example 21. The at least one machine-readable storage medium of example 12, wherein the one or more memory operations include stores and loads and the allowance of the one or more memory operations is based at least in part on a merge operation or a scatter operation.

Example 22. A processor for automated compiler transformations, the processor comprising a plurality of processing elements operable to cause a compiler to: use cyclic buffering for one or more nested loops to allow reuse of values from one or more streams associated with the one or more processing elements; or perform one or more memory accesses in an inner loop via the one or more streams based on a rolling window of values; or allow one or more memory operations associated with an unrolled loop to occur at a later time with at least one unit-stride access via the one or more streams; or perform an unroll-and-squash procedure via the one or more streams.

Example 23. The processor of example 22, wherein the one or more processors are configurable spatial accelerators (CSA).

Example 24. The processor of example 22, wherein the compiler is a CSA optimizing complier.

Example 25. The processor of example 23, wherein the one or more streams is a latency insensitive channel (LIC) associated with communication among the one or more processing elements of each of the one or more CSAs.

Example 26. The processor of example 22, wherein the cyclic buffering comprises using the one or more streams to circulate data without any redundant trips to memory and wherein the one or more nested loops includes an inner loop with a short trip-count.

Example 27. The processor of example 26, wherein the data is circulated via a rotate operation.

Example 28. The processor of example 22, wherein the memory accesses associated with the performance of the one or more memory access includes stencil-based memory accesses.

Example 29. The processor of example 22, wherein the rolling window of values comprises, at each output position, an input value used in a previous position is dropped and a new value is loaded from memory.

Example 30. The processor of example 29, wherein the rolling window of values comprises performing a shift operation.

Example 31. The processor of example 22, wherein the one or more memory operations include stores and loads and the allowance of the one or more memory operations is based at least in part on a merge operation or a scatter operation.

Example 32. A system comprising the at least one machine-readable storage medium of any one of examples 12 to 21.

Example 33. A system comprising the processor of any one of examples 22 to 31.

Example 34. A method for automated compiler transformations, the method comprising: using cyclic buffering for one or more nested loops to allow reuse of values from one or more streams associated with the one or more processing elements; or performing one or more memory accesses in an inner loop via the one or more streams based on a rolling window of values; or allowing one or more memory operations associated with an unrolled loop to occur at a later time with at least one unit-stride access via the one or more streams; or performing an unroll-and-squash procedure via the one or more streams.

Example 35. The method of example 34, the method being performed by one or more processors.

Example 36. The method of example 35, wherein the one or more processors are configurable spatial accelerators (CSA).

Example 37. The method of example 35, wherein the one or more streams is a latency insensitive channel (LIC) associated with communication among the one or more processing elements of each of the one or more CSAs.

Example 38. The method of example 34, wherein the cyclic buffering comprises using the one or more streams to circulate data without any redundant trips to memory and wherein the one or more nested loops includes an inner loop with a short trip-count.

Example 39. The method of example 34, wherein the memory accesses associated with the performing of the one or more memory access includes stencil-based memory accesses.

Example 40. The method of example 34, wherein the rolling window of values comprises, at each output position, an input value used in a previous position is dropped and a new value is loaded from memory.

Example 41. The method of example 34, wherein the one or more memory operations include stores and loads and the allowing of the one or more memory operations is based at least in part on a merge operation or a scatter operation.

Example 42. An apparatus comprising means to perform the method of any one of examples 34 to 41.

Example 43. At least one machine-readable storage medium comprising means to perform the method of any one of the examples 34 to 41.

Example 44. A system comprising means to perform the method of any one of examples 34 to 41.

Example 45. An apparatus comprising the at least one machine-readable storage medium of any one of examples 12 to 21.

Example 46. A system comprising the at least one machine-readable storage medium of any one of examples 12 to 21.

Example 47. A method for a compiler optimization pseudo-algorithm, the method comprising: distributing input elements among a plurality of processing elements of a processor via replication using unrolling; creating and loading data into one or more streams; performing computation; performing data reuse and communication; and creating and storing results in the one or more streams.

Example 48. The method of example 47, wherein the processor is a configurable spatial accelerator (CSA).

Example 49. The method of example 47, wherein the one or more streams is a latency insensitive channel (LIC) associated with communication among the plurality of processing elements.

Example 50. An apparatus for a compiler optimization pseudo-algorithm, the apparatus comprising: one or more processors, each processor comprising a plurality of processing elements, the one or more processors operable to cause a compiler to: distribute input elements among a plurality of processing elements of a processor via replication using unrolling; create and load data into one or more streams; perform computation; perform data reuse and communication; and create and store results in the one or more streams.

Example 51. At least one machine-readable storage medium for a compiler optimization pseudo-algorithm comprising instructions that when executed by at least one processor, the processor comprising a plurality of processing elements and operable to cause a compiler to: distribute input elements among a plurality of processing elements of a processor via replication using unrolling; create and load data into one or more streams; perform computation; perform data reuse and communication; and create and store results in the one or more streams.

Example 52. A processor for a compiler optimization pseudo-algorithm the processor comprising a plurality of processing elements operable to cause a compiler to: distribute input elements among a plurality of processing elements of a processor via replication using unrolling; create and load data into one or more streams; perform computation; perform data reuse and communication; and create and store results in the one or more streams.

Example 53. A system comprising the apparatus of example 50.

Example 54. A system comprising the at least one machine-readable storage medium of example 51.

Example 55. A system comprising the processor of example 52.

Example 56. An apparatus comprising means to perform the method of any one of examples 47 to 49.

Example 57. A system comprising means to perform the method of any one of examples 47 to 49.

Example 58. At least one machine-readable storage medium comprising means to perform the method of any one of the examples 47 to 49.

Example 59. An apparatus comprising the at least one machine-readable storage medium of example 51.

Example 60. A system comprising the at least one machine-readable storage medium of example 51.

What is claimed is:

1. An apparatus comprising:
one or more processors, each processor comprising a plurality of processing elements at least a portion of which is in hardware, the one or more processors operable to cause a compiler to:
use cyclic buffering for one or more nested loops to allow reuse of values from one or more streams associated with the one or more processing elements; and
wherein the cyclic buffering comprises using the one or more streams to circulate data without any redundant trips to memory and wherein the one or more nested loops includes an inner loop with a short trip-count; and
wherein the data is circulated via a rotate operation between the one or more streams.

2. The apparatus of claim 1, wherein the one or more processors are configurable spatial accelerators (CSA) and wherein the compiler is a CSA optimizing complier.

3. The apparatus of claim 2, wherein the one or more streams is a latency insensitive channel (LIC) associated with communication among the one or more processing elements of each of the one or more CSAs.

4. The apparatus of claim 1, the one or more processors operable to cause the compiler to perform one or more memory accesses in an inner loop via the one or more streams based on a rolling window of values, wherein the memory accesses associated with the performance of the one or more memory access includes stencil-based memory accesses.

5. The apparatus of claim 4, wherein the rolling window of values comprises, at each output position, an input value used in a previous position is dropped and a new value is loaded from memory.

6. The apparatus of claim 5, wherein the rolling window of values comprises performing a shift operation.

7. The apparatus of claim 1, the one or more processors operable to cause the compiler to allow one or more memory operations associated with an unrolled loop to occur at a later time with at least one unit-stride access via the one or more streams, wherein the one or more memory operations include stores and loads and the allowance of the one or more memory operations is based at least in part on a merge operation or a scatter operation.

8. At least one non-transitory machine-readable storage medium comprising instructions that when executed by at least one processor, the processor comprising a plurality of processing elements and operable to cause a compiler to:
use cyclic buffering for one or more nested loops to allow reuse of values from one or more streams associated with the one or more processing elements; and
wherein the cyclic buffering comprises using the one or more streams to circulate data without any redundant trips to memory and wherein the one or more nested loops includes an inner loop with a short trip-count; and
wherein the data is circulated via a rotate operation between the one or more streams.

9. The at least one machine-readable storage medium of claim 8, wherein the one or more processors are configurable spatial accelerators (CSA) and wherein the compiler is a CSA optimizing complier.

10. The at least one machine-readable storage medium of claim 9, wherein the one or more streams is a latency insensitive channel (LIC) associated with communication among the one or more processing elements of each of the one or more CSAs.

11. The at least one machine-readable storage medium of claim 8, the one or more processors operable to cause the compiler to perform one or more memory accesses in an inner loop via the one or more streams based on a rolling window of values, wherein the memory accesses associated with the performance of the one or more memory access includes stencil-based memory accesses.

12. The at least one machine-readable storage medium of claim 11, wherein the rolling window of values comprises, at each output position, an input value used in a previous position is dropped and a new value is loaded from memory.

13. The at least one machine-readable storage medium of claim 12, wherein the rolling window of values comprises performing a shift operation.

14. The at least one machine-readable storage medium of claim 8, the one or more processors operable to cause the compiler to allow one or more memory operations associated with an unrolled loop to occur at a later time with at least one unit-stride access via the one or more streams, wherein the one or more memory operations include stores and loads and the allowance of the one or more memory operations is based at least in part on a merge operation or a scatter operation.

15. A processor comprising:
a plurality of processing elements at least a portion of which is in hardware, the processing elements operable to cause a compiler to:
use cyclic buffering for one or more nested loops to allow reuse of values from one or more streams associated with the one or more processing elements; and
wherein the cyclic buffering comprises using the one or more streams to circulate data without any redundant trips to memory and wherein the one or more nested loops includes an inner loop with a short trip-count; and
wherein the data is circulated via a rotate operation between the one or more streams.

16. The processor of claim 15, wherein the one or more processors are configurable spatial accelerators (CSA) and wherein the compiler is a CSA optimizing complier.

17. The processor of claim 16, wherein the one or more streams is a latency insensitive channel (LIC) associated with communication among the one or more processing elements of each of the one or more CSAs.

18. The processor of claim 15, the processing elements operable to cause the compiler to perform one or more memory accesses in an inner loop via the one or more streams based on a rolling window of values, wherein the rolling window of values comprises, at each output position, an input value used in a previous position is dropped and a new value is loaded from memory.

19. The processor of claim 18, wherein the one or more memory operations include stores and loads and the allowance of the one or more memory operations is based at least in part on a merge operation or a scatter operation.

20. The processor of claim 18, wherein the memory accesses associated with the performance of the one or more memory access includes stencil-based memory accesses.

* * * * *